United States Patent
Katz et al.

(10) Patent No.: US 11,586,431 B1
(45) Date of Patent: *Feb. 21, 2023

(54) DYNAMICALLY UPGRADING JAVA RUNTIME ENVIRONMENTS WITH RUNNING APPLICATIONS

(71) Applicant: Rapid7, Inc., Boston, MA (US)

(72) Inventors: Sharon Katz, Toronto (CA); Jeffrey Myers, Somerville, MA (US); Paul-Andrew Joseph Miseiko, Mississauga (CA); John Southern, Toronto (CA); Tyler Stiller, Alexandria, VA (US)

(73) Assignee: Rapid7 , Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,046

(22) Filed: Dec. 8, 2021

Related U.S. Application Data

(63) Continuation of application No. 16/944,603, filed on Jul. 31, 2020, now Pat. No. 11,226,807.

(51) Int. Cl.
| | |
|---|---|
| *G06F 8/65* | (2018.01) |
| *H04L 9/40* | (2022.01) |
| *G06F 9/455* | (2018.01) |
| *G06F 9/445* | (2018.01) |

(52) U.S. Cl.
CPC ............ *G06F 8/65* (2013.01); *G06F 9/44526* (2013.01); *G06F 9/45516* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,393,605 B1 * | 5/2002 | Loomans | G06F 9/44526 |
| | | | 717/121 |
| 6,546,554 B1 * | 4/2003 | Schmidt | G06F 8/61 |
| | | | 717/121 |
| 7,735,076 B2 | 6/2010 | Sawyer | |
| 8,230,417 B1 * | 7/2012 | Clark | G06F 8/61 |
| | | | 717/174 |
| 8,751,466 B1 | 6/2014 | Tsay | |
| 9,460,719 B1 * | 10/2016 | Antunes | G06Q 10/10 |
| 9,633,696 B1 | 4/2017 | Miller et al. | |
| 10,896,117 B2 * | 1/2021 | Hulick, Jr. | G06F 11/3495 |
| 11,226,807 B1 * | 1/2022 | Katz | H04L 67/10 |
| 2005/0120346 A1 | 6/2005 | Sprigg | |
| 2007/0101322 A1 | 5/2007 | Muschett et al. | |

(Continued)

*Primary Examiner* — Marina Lee
(74) *Attorney, Agent, or Firm* — Ashwin Anand

(57) ABSTRACT

Disclosed herein are methods, systems, and processes to perform self-dependent upgrades of Java Runtime Environments (JREs). A request to update a plugin to a new version with a new configuration that includes a location to download a new upgrader-executable is received from a platform computing device at an endpoint computing device. The plugin is uploaded to the new version. The new upgrader-executable that includes an executable with an executable table executed by the plugin is downloaded from the location. The executable is used to halt execution of a JRE application (e.g., a Collector) and download JRE files required for the upgrade. The JRE application (e.g., the Collector) is then re-started with the new configuration, which can be rolled back if the upgrade is unsuccessful.

20 Claims, 3 Drawing Sheets

(56) References Cited

U.S. PATENT DOCUMENTS

| | | |
|---|---|---|
| 2010/0312879 A1 | 12/2010 | Taieb |
| 2011/0321024 A1 | 12/2011 | Knothe et al. |
| 2013/0212573 A1* | 8/2013 | Archer ............... G06F 8/65 |
| | | 717/171 |
| 2016/0162274 A1 | 6/2016 | Dokai |
| 2016/0291940 A1* | 10/2016 | Searle ............. H04L 67/303 |
| 2019/0235897 A1 | 8/2019 | Goel |
| 2020/0167444 A1* | 5/2020 | Singri ............... G06F 8/65 |

* cited by examiner

DYNAMICALLY UPGRADING JAVA RUNTIME ENVIRONMENTS WITH RUNNING APPLICATIONS

CROSS-REFERENCE TO RELATED APPLICATIONS

This application is a continuation of U.S. patent application Ser. No. 16/944,603, filed Jul. 31, 2020, now U.S. Pat. No. 11,226,807, issued on Jan. 18, 2022, which is hereby incorporated by reference herein in its entirety.

BACKGROUND

Field of the Disclosure

This disclosure is related is to Java Runtime Environments (JREs). In particular, this disclosure is related to remotely upgrading the JRE of an existing software project in a self-dependent manner.

Description of the Related Art

The Java Runtime Environment (JRE) is a set of software tools for development of Java-based applications. JRE combines Java Virtual Machine (JVM), core classes, and supporting libraries. The Java intermediate bytecode executes in the runtime environment (e.g., according to rules laid out in the JVM specification).

Java-based applications execute and are dependent on a JRE. Unfortunately, it is not possible for such applications to update and/or upgrade the JRE, while the applications are actively executing in the JRE.

SUMMARY OF THE DISCLOSURE

Disclosed herein are methods, systems, and process to remotely upgrade the JRE of an existing and actively executing application in a self-dependent manner. In certain embodiments, one such method involves receiving a request to update a plugin to a new version with a new configuration that includes a location to download a new upgrader-executable, updating the plugin to the new version, downloading, from the location, the new upgrader-executable that includes an executable with an executable table executed by the new version, halting, using the executable, execution of an application, downloading, using the executable, files required for the upgrade, and re-starting the application with the new configuration.

In some embodiments, the request is received from a platform computing device, the request is received by an endpoint computing device, the application is a Java Runtime Environment (JRE) application, the files are JRE files, the executable is validated with a signature file, the plugin is a bundle plugin, and the plugin is remotely installed and configured.

In other embodiments, the method involves launching a collector associated with the application, monitoring the health of the collector to indicate whether or not the upgrade was successful, and if the collector upgrade is not successful, resetting the collector to a previously running version (downgrading the JRE). In this example, monitoring the collector indicates whether the upgrade was successful, and the method rolls back the collector to a previously running version if the upgrade is not successful by resetting the collector to an old configuration and downgrading the application to the old configuration.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
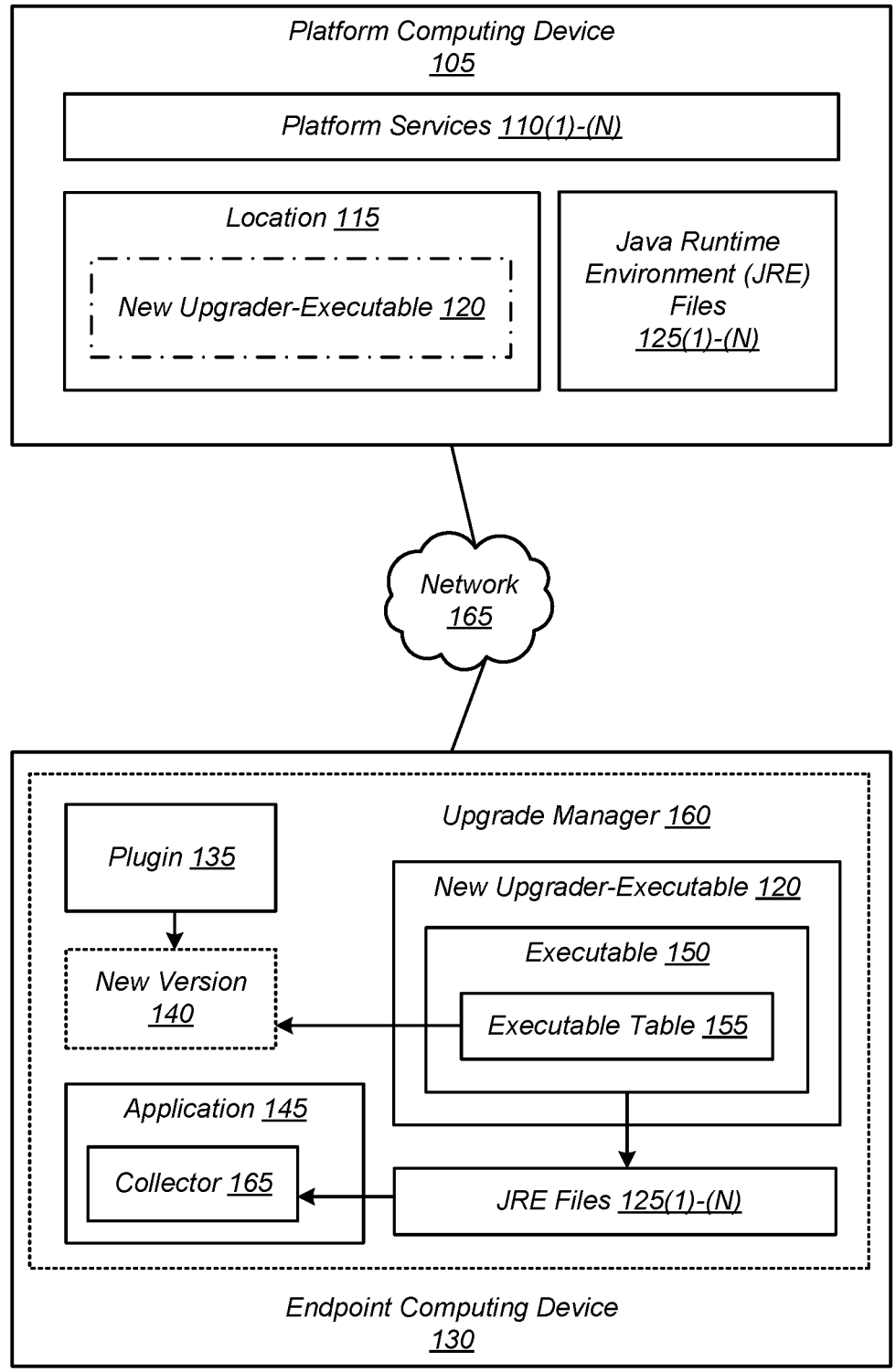
FIG. 1 is a block diagram 100 of a self-updating Java Runtime Environment (JRE), according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

In cloud-based computing environments, a computing platform (hereinafter "platform") is often used to provision services. The Insight Platform provided by Rapid7® of Boston, Mass. provisions various cloud-based cybersecurity applications, solutions, and/or services, examples of which include, but are not limited to, vulnerability risk management (VRM), incident detection and response (IDR), security information and event management (SIEM), log management, penetration testing, dynamic application security testing (DAST), cloud security posture management (CSPM), enterprise network traffic analysis (ENTA), runtime application self-protection (RASP), web application firewall (WAF), and the like (hereinafter "platform services"), in conjunction with one or more on-premise components (e.g., Collectors).

Certain applications depend on the Java Runtime Environment (JRE) to execute in a host computing environment. As noted, JRE is a set of software tools for development of Java-based applications. JRE combines Java Virtual Machine (JVM), core classes, and supporting libraries. The Java intermediate bytecode executes in the runtime environment (e.g., according to rules laid out in the JVM specification). Given the ubiquitous nature of Java-based applications, the JRE is frequently updated and/or upgraded (e.g., to fix bugs, introduce new features, and the like). Because Java-based applications execute and are dependent on a JRE, these applications cannot function properly if the JRE is not updated and/or upgraded.

In a typical scenario, a JRE is installed on an endpoint computing device (hereinafter "endpoint") and a specific program is then run on the JRE. Therefore, from the perspective of the endpoint, the endpoint runs the JRE and the JRE runs the program code for the application (e.g., a Collector, which can be used to gather logs and other events from a customer's on-premises environment and then sent to the Cloud for analysis). Unfortunately, and as previously noted, the program code that is running on the endpoint cannot replace the very environment that the program code is running on. A JRE can be updated from one version to another by having an information technology (IT) administrator manually install updated files for the new JRE as well as a fresh version of the underlying application. However, replacing the JRE with a new version of the JRE also gets rid of the underlying application(s) executing in the previous-version of the JRE. Moreover, such manual intervention is cost and time prohibitive in terms of resources.

In cloud-based cybersecurity computing environments, the above-mentioned technical problem is prescient. For example, a cloud-based cybersecurity platform computing device (hereinafter "platform") that implements an IDR application depends on a mechanism called a Collector. A Collector is an on-premises component of an IDR application (e.g., InsightIDR provided by Rapid7® of Boston, Mass.) that either polls data or receives data from Event Sources and sends this data to the platform where it is processed and made available for security-based analysis (e.g., as part of a SIEM). An Event Source represents a single computing device such as an endpoint that sends logs to the Collector. For example, if customer has three firewalls, there will be one Event Source for each firewall in the Collector.

Therefore, because a Collector is already executing on endpoints, these Collectors can be configured to perform self-dependent upgrades and/or updates of their underlying JREs. FIG. 1 is a block diagram 100 of a self-updating JRE, according to one embodiment. Platform computing device 105 (hereinafter "platform 105") is a cloud-based platform that provides platform services 110(1)-(N) (e.g., as noted above). Platform 105 also includes a location 115 that includes a new upgrader-executable 120. Platform 105 also maintains JRE files 125(1)-(N).

Platform 105 is communicatively coupled to an endpoint computing device 130 (hereinafter "endpoint 130"). Endpoint 130 includes a plugin 135 (e.g., an upgrader plugin or a Java plugin) and executes an application 145. Endpoint 130 can execute more than one application (e.g., more than one Java-based JRE applications). Platform 105 refers to services (e.g., platform services 110(1)-(N) running on the cloud to control application 145. New upgrader-executable 120 is an executable that can stop (or halt) application 145, start (re-start) application 145, and replace necessary files (e.g., JRE files 125(1)-(N)).

In some embodiments, plugin 135 is a bundle plugin that can be remotely installed and configured by platform 105. For example, plugin 135 can be updated into a new version 140. The operations associated with updating the JRE of endpoint 130 is performed by an upgrade manager 160. Upgrade manager 160 implements a plugin mechanism (e.g., built on a bundles mechanism) that provides a Java plugin (e.g., new version 140) that stops a Java application (e.g., application 145), updates the needed files for a new and updated JRE, and then restarts the Java application (e.g., application 145). In this example, Collector 165 is part of application 145.

In certain embodiments, upgrade manager 160 receives a request to update plugin 135 with a new configuration (e.g., an indication that an existing JRE has to updated) that includes location 115 to download new upgrader-executable 120 (as shown in FIG. 1). Upgrade manager 160 then updates plugin 135 to new version 140 (of plugin 135). For example, because platform 105 already has the ability to upgrade a bundle, a new bundle (e.g., an upgrader plugin such as new version 140 as shown in FIG. 1) is sent to collector 165.

Next, and in some embodiments, collector 165, using new version 140 (e.g., the updated Java plugin) downloads, from location 115, new upgrader-executable 120 that includes an executable 150 with executable table 155 that is executed by new version 140 (e.g., a new upgrader plugin bundle for plugin 135). For example, collector 165 is instructed by upgrade manager 160 to download the new upgrader plugin bundle (e.g., from platform 105 as part of new upgrader-executable 120). The new upgrader plugin bundle then downloads executable 150 (which, in one embodiment, is validated with a signature file) and executes executable 150, which performs the upgrade/update of the JRE. It should be noted that executable 150 does not run on Java (to be able to perform the update of the underlying JRE). For example, executable 150 can run on Go Code (among other code formats).

Finally, in other embodiments, executable 150 halts or stops, using executable 150, execution of application 145 (e.g., kills collector 165), downloads, using executable 150, one or more files required for the upgrade (e.g., replaces the existing JRE and places (new) JRE files 125(1)-(N) in the appropriate location(s) for the new JRE), and then re-starts application 145 with the new configuration (e.g., executable 150 re-runs collector 165 and then terminates itself).

In certain embodiments, after the upgrade has been performed, upgrade manager 160 launches collector 165 associated with application 145. The health of collector 165 is then monitored to receive an indication whether the upgrade was successful or unsuccessful (e.g., whether collector 165 is operating as configured and is gathering logs and events). If the upgrade of collector 165 is not successful, upgrade manager 160 resets collector 165 to a previously running version (e.g., downgrades the JRE) and enables collector 165 to start working again appropriately. This foregoing rollback operation ensures that collector 165 can revert back to an old configuration of the JRE without requiring further manual intervention to re-install the previous JRE.

In certain embodiments, when the Java upgrader plugin (e.g., new version 140) downloads executable 150 (as part of new upgrader-executable 120 from platform 105), the Java upgrader plugin verifies that a signature file of executable 150 matches a signature provided by platform 105. In addition, in some embodiments, when the Java upgrader plugin runs executable 150, executable 150 is run as a child process which is terminated when the child process subsequently terminates the Java environment (e.g., the previous/old JRE). Therefore, in this example, the child process is orphaned.

It should be noted that foregoing operations are performed on an existing piece of software (e.g., the Collector) and deployed in a distributed manner without requiring a customer to re-install any software, but rather, perform such upgrades using the existing plugin update mechanism (e.g., based on Open Service Gateway Initiative (OSGi), among others).

Figure 2:
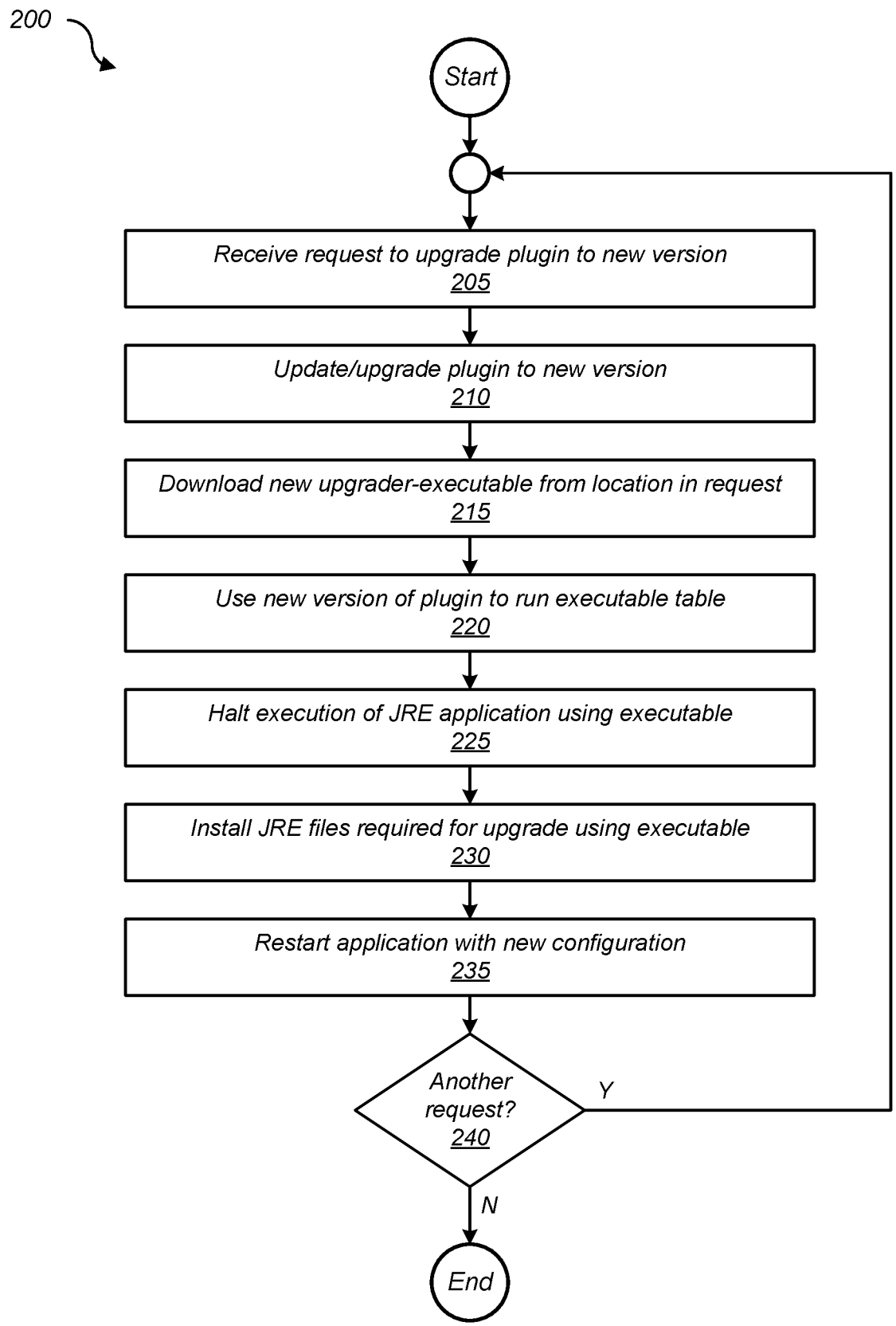
FIG. 2 is a flowchart 200 that illustrates a process for self-updating a JRE, according to one embodiment of the present disclosure.

FIG. 2 is a flowchart 200 that illustrates a process for self-updating a JRE, according to one embodiment. The process begins at 205 by receiving a request to upgrade a plugin to a new version (e.g., to a Java upgrader plugin bundle like new version 140). At 210, the process updates/upgrades the plugin (e.g., plugin 135) to a new version (e.g., new version 140, which, in this example, is a Java upgrader plugin bundle). At 215, the process downloads a new upgrader-executable from a location specified in the request (e.g., new upgrader-executable 120 from location 115), and at 220, uses the new version of the plugin (e.g., the upgrader plugin) to run the executable table of the executable. At 225, the process halts execution of the JRE application (e.g., application 145 with collector 165) using the executable (e.g., executable 150), and at 230, installs JRE files required for the upgrade using the executable. At 235, the process restarts the application with the new configuration. At 240, the process determines if there is another request. If there is another request, the process loops to 205. Otherwise, the process ends.

As noted above, after the upgrade occurs, the process of FIG. 2 attempts to launch the Collector again and monitors the health of the Collector to indicate whether or not the upgrade was successful. If the Collector upgrade is not successful, the process resets the Collector back to the previously running version (downgrades the JRE) and gets the Collector working again, ensuring that an erroneous or problematic upgrade can be rolled back without disrupting the operation(s) of the Collector in gathering logs and events from customer environments.

In certain embodiments, the computing system illustrated in FIG. 1 (e.g., platform 105 and endpoint 130 in conjunction with upgrade manager 160) performs at least the following operational steps to remotely upgrade a JRE in a self-dependent manner: (a) platform 105 requests application 145 to update its plugin 135 to new version 140 with a new configuration that includes location 115 to download new upgrader-executable 120, (b) plugin 135 is updated and new version 140 downloads new upgrader-executable 120 (a signature file validates executable 150), (c) executable table 155 is run by new version 140, (d) executable 150 stops or halts application 145, (e) executable 150 downloads JRE files 125(1)-(N) needed for the upgrade (and places the JRE files in an appropriate location in endpoint 130 for the new JRE), and (f) executable 150 starts application 145, now with the new JRE in place.

Example Computing and Networking Environment

Figure 3:
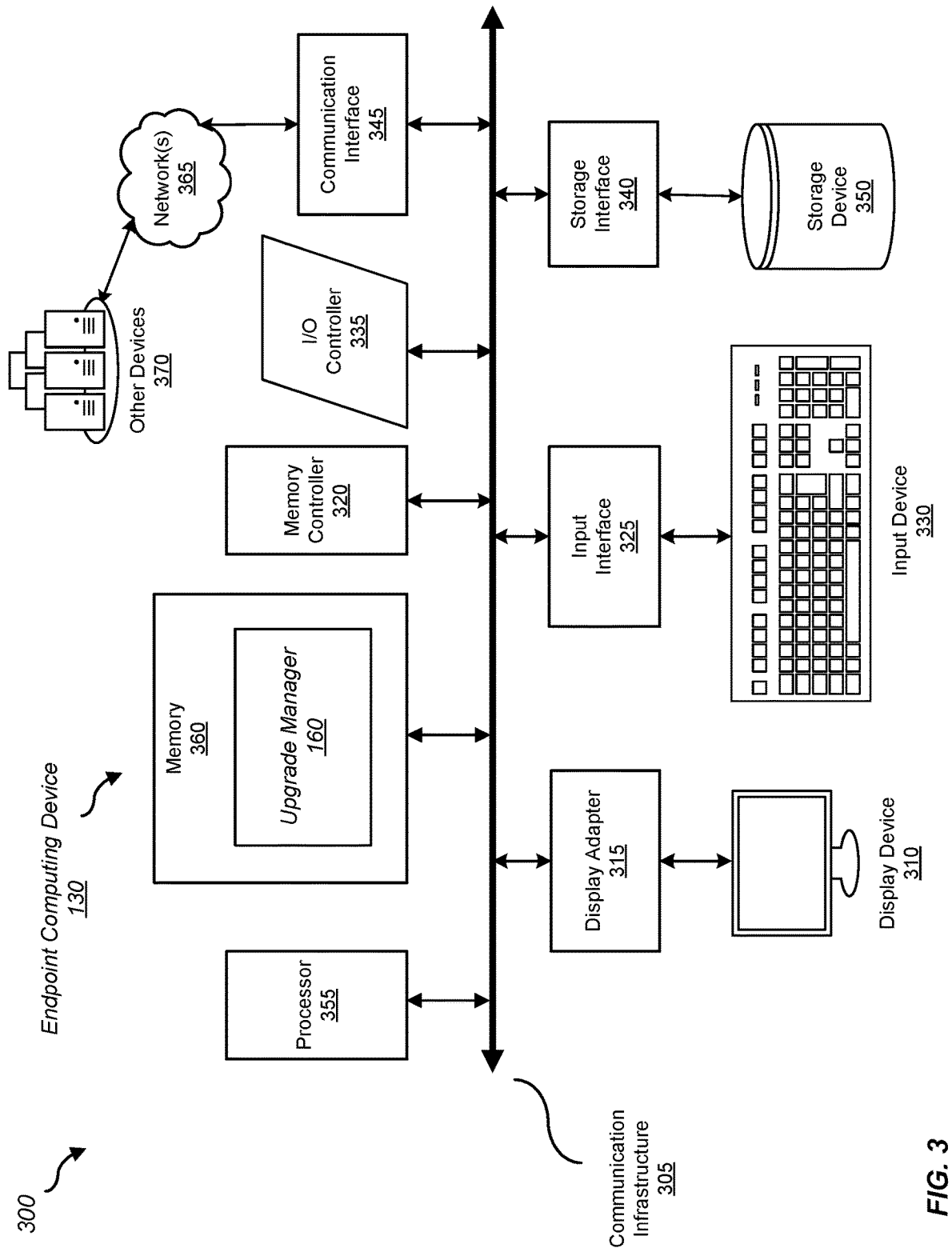
FIG. 3 is a block diagram 300 of a networked computing system, illustrating how an upgrade manager can be implemented in software, according to one embodiment of the present disclosure.

FIG. 3 is a block diagram 300 of a computing system, illustrating how an upgrade manager can be implemented in software, according to one embodiment. Computing system 300 can include endpoint 130 and broadly represents any single or multi-processor computing device or system capable of executing computer-readable instructions. Examples of computing system 300 include, without limitation, any one or more of a variety of devices including workstations, personal computers, laptops, client-side terminals, servers, distributed computing systems, handheld devices, network appliances, storage controllers (e.g., array controllers, tape drive controller, or hard drive controller), and the like. In its most basic configuration, computing system 300 may include at least one processor 355 and a memory 360. By executing the software that executes upgrade manager 160 computing system 300 becomes a special purpose computing device that is configured to perform self-dependent upgrades of JREs.

Processor 355 generally represents any type or form of processing unit capable of processing data or interpreting and executing instructions. In certain embodiments, processor 355 may receive instructions from a software application or module. These instructions may cause processor 355 to perform the functions of one or more of the embodiments described and/or illustrated herein. For example, processor 355 may perform and/or be a means for performing all or some of the operations described herein. Processor 355 may also perform and/or be a means for performing any other operations, methods, or processes described and/or illustrated herein.

Memory 360 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 300 may include both a volatile memory unit and a non-volatile storage device. In one example, program instructions implementing upgrade manager 160 may be loaded into memory 360 (e.g., memory 360 of endpoint 130 as shown in FIG. 3). Other devices 370 can include other endpoints 130(2)-(N) that can include their own memory for performing self-dependent upgrades of JREs from a centralized location like platform 105.

In certain embodiments, computing system 300 may also include one or more components or elements in addition to processor 355 and/or memory 360. For example, as illustrated in FIG. 3, computing system 300 may include a memory controller 320, an Input/Output (I/O) controller 335, and a communication interface 345, each of which may be interconnected via a communication infrastructure 305. Communication infrastructure 305 generally represents any type or form of infrastructure capable of facilitating communication between one or more components of a computing device. Examples of communication infrastructure 305 include, without limitation, a communication bus (such as an Industry Standard Architecture (ISA), Peripheral Component Interconnect (PCI), PCI express (PCIe), or similar bus) and a network.

Memory controller 320 generally represents any type/form of device capable of handling memory or data or controlling communication between one or more components of computing system 300. In certain embodiments memory controller 320 may control communication between processor 355, memory 360, and I/O controller 335 via communication infrastructure 305. In certain embodiments, memory controller 320 may perform and/or be a means for performing, either alone or in combination with other elements, one or more of the operations or features described and/or illustrated herein. I/O controller 335 generally represents any type or form of module capable of coordinating and/or controlling the input and output functions of a computing device. For example, in certain embodiments I/O controller 335 may control or facilitate transfer of data between one or more elements of computing system 300, such as processor 355, memory 360, communication interface 345, display adapter 315, input interface 325, and storage interface 340.

Communication interface 345 broadly represents any type/form of communication device/adapter capable of facilitating communication between computing system 300 and other devices and may facilitate communication between computing system 300 and a private or public network. Examples of communication interface 345 include, a wired network interface, a wireless network interface, a modem, and any other suitable interface. Communication interface 345 may provide a direct connection to a remote server via a direct link to a network, such as the Internet, and may also indirectly provide such a connection through, for example, a local area network. Communication interface 345 may also represent a host adapter configured to facilitate communication between computing system 300 and additional network/storage devices via an external bus.

Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 300 may also include at least one display device 310 coupled to communication infrastructure 305 via a display adapter 315 that generally represents any type or form of device capable of visually displaying information forwarded by display adapter 315. Display adapter 315 generally represents any type or form of device configured to forward graphics, text, and other data from communication infrastructure 305 (or from a frame buffer, as known in the art) for display on display device 310. Computing system 300 may also include at least one input device 330 coupled to communication infrastructure 305 via an input interface 325. Input device 330 generally represents any type or form of input device capable of providing input, either computer or human generated, to computing system 300. Examples of input device 330 include a keyboard, a pointing device, a speech recognition device, or any other input device.

Computing system 300 may also include storage device 350 coupled to communication infrastructure 305 via a storage interface 340. Storage device 350 generally represents any type or form of storage devices or mediums capable of storing data and/or other computer-readable instructions. For example, storage device 350 may include a magnetic disk drive (e.g., a so-called hard drive), a floppy disk drive, a magnetic tape drive, an optical disk drive, a flash drive, or the like. Storage interface 340 generally represents any type or form of interface or device for transmitting data between storage device 350, and other components of computing system 300. Storage device 350 may be configured to read from and/or write to a removable storage unit configured to store computer software, data, or other computer-readable information. Examples of suitable removable storage units include a floppy disk, a magnetic tape, an optical disk, a flash memory device, or the like. Storage device 350 may also include other similar structures or devices for allowing computer software, data, or other computer-readable instructions to be loaded into computing system 300. For example, storage device 350 may be configured to read and write software, data, or other computer-readable information. Storage device 350 may also be a part of computing system 300 or may be separate devices accessed through other interface systems.

Many other devices or subsystems may be connected to computing system 300. Conversely, all of the components and devices illustrated in FIG. 3 need not be present to practice the embodiments described and/or illustrated herein. For example, other devices 370 can include various other endpoints 130(2)-(N) which can be controlled by platform 105. Platform 105 can be used to upgrade the JREs of multiple endpoints, which is illustrated as other devices 370 in FIG. 3. The devices and subsystems referenced above may also be interconnected in different ways from that shown in FIG. 3. Computing system 300 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 300 for storage in memory via a network such as the Internet or upon a carrier medium.

The computer-readable medium containing the computer program may be loaded into computing system 300. All or a portion of the computer program stored on the computer-readable medium may then be stored in memory 360, and/or various portions of storage device 350. When executed by processor 355, a computer program loaded into computing system 300 may cause processor 355 to perform and/or be a means for performing the functions of one or more of the embodiments described/illustrated herein. Alternatively, one or more of the embodiments described and/or illustrated herein may be implemented in firmware and/or hardware.

Network 365 (shown as network 165 in FIG. 1) generally represents any type or form of computer network or architecture capable of facilitating communication between endpoint 130 and platform 105 For example, network 365 can be a Wide Area Network (WAN) (e.g., the Internet) or a Local Area Network (LAN). In certain embodiments, a communication interface, such as communication interface 345 in FIG. 3, may be used to provide connectivity between platform 105, endpoint 130, and network 140. The embodiments described and/or illustrated herein are not limited to the Internet or any particular network-based environment.

In some examples, all or a portion of platform 105 and/or endpoint 130 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, upgrade manager 160 may transform the behavior of endpoint 130 to perform self-dependent upgrades of JREs.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
performing, by a computing device:
   executing a Java application in a Java Runtime Environment (JRE);
   downloading a plugin from a platform computing device of a cloud-based platform;
   executing the plugin to download an upgrader executable for upgrading the JRE;
   executing the upgrader executable, wherein
      the execution of the upgrader executable comprises:
         halting the execution of the Java application, and
         downloading one or more files for upgrading the JRE; and
   re-starting the Java application after the JRE is updated with the one or more files.

2. The method of claim 1, wherein
the plugin is downloaded in response to a request from the platform computing device.

3. The method of claim 2, wherein
the request indicates a location where to download the upgrader executable.

4. The method of claim 1, wherein
downloading the plugin comprises downloading an update to the plugin, and
the method further comprises updating the plugin to a new version based on the downloaded update.

5. The method of claim 1, wherein
the plugin is a bundle plugin.

6. The method of claim 1, further comprising the computing device:
validating the upgrader executable based on a signature file.

7. The method of claim 1, further comprising the computing device:
launching a collector associated with the Java application;
determining that a first upgrade of the JRE is not successful; and
rolling back the collector to a previous running state based on the determination that the first upgrade is not successful.

8. The method of claim 1, wherein
the cloud-based platform performs one or more cybersecurity services for a client network including the computing device.

9. The method of claim 8, wherein
the Java application implements a collector that collects data about the client network or the computing device and sends the collected data to the cloud-based platform.

10. The method of claim 1, wherein
the cloud-based platform is accessible over a public network, and
the plugin and the upgrader executable are downloaded over the public network.

11. A system comprising:
a computing device implemented by one or more processors and associated memory, configured to:
execute a Java application in a Java Runtime Environment (JRE);
download a plugin from a platform computing device of a cloud-based platform;
execute the plugin to download an upgrader executable for upgrading the JRE;
execute the upgrader executable to:
halt the execution of the Java application;
download one or more files for upgrading the JRE; and
re-start the Java application after the JRE is updated with the one or more files.

12. The system of claim 11, wherein
the computing device is configured to download the plugin in response to a request from the platform computing device.

13. The system of claim 12, wherein
the request indicates a location where to download the upgrader executable.

14. The system of claim 11, wherein
the computing device is configured to update the plugin to a new version based on an update to the plugin downloaded from the platform computing device.

15. The system of claim 11, wherein
the computing device is configured to validate the upgrader executable based on a signature file.

16. The system of claim 11, wherein
the computing device is configured to:
determine that a first upgrade of the JRE is not successful, and
roll back the Java application to a previous running state based on the determination that the first upgrade is not successful.

17. The system of claim 11, wherein
the cloud-based platform performs one or more cybersecurity services for a client network that includes the computing device, and
the Java application implements a collector that collects data about the client network or the computing device and sends the collected data to the platform.

18. One or more non-transitory computer readable storage media storing program instructions that when executed on one or more processors of a computing device cause the computing device to:
download a plugin from a platform computing device of a cloud-based platform;
execute the plugin to download an upgrader executable for upgrading a Java runtime environment (JRE);
execute the upgrader executable to:
halt execution of a Java application executing in the JRE, and
download one or more files for upgrading the JRE; and
re-start the Java application after the JRE is updated with the one or more files.

19. The one or more non-transitory computer readable storage media of claim 18, wherein
the program instructions when executed on the one or more processors cause the computing device to download the plugin in response to a request from a platform computing device.

20. The one or more non-transitory computer readable storage media of claim 19, wherein
the program instructions when executed on the one or more processors cause the computing device to determine a location where to download the upgrader executable from the request.

* * * * *